United States Patent [19]
Marsico, Jr. et al.

[11] 3,821,408
[45] June 28, 1974

[54] COMPOSITIONS OF SULFONIUM YLIDES AND METHOD OF USE

[75] Inventors: Joseph William Marsico, Jr., Pearl River, N.Y.; Andrew Stephen Tomcufcik, Old Tappan, N.J.; Leon Goldman, Nanuet, N.Y.

[73] Assignee: American Cyanamid Company, Stamford, Conn.

[22] Filed: Dec. 26, 1972

[21] Appl. No.: 317,996

[52] U.S. Cl................................ 424/331, 424/275
[51] Int. Cl.............................................. A61k 27/00
[58] Field of Search..................................... 424/331

[56] References Cited
OTHER PUBLICATIONS
Chemical Abstracts, 64: 11207(f) (1966).

*Primary Examiner*—Jerome D. Goldberg
*Attorney, Agent, or Firm*—Ernest Y. Miller

[57] ABSTRACT

Compositions containing 3-dialkylsulfonium ylides of 2-hydroxy-1,4-napthoquinone and method of use is described. The compositions are useful as anti-inflammatory agents.

8 Claims, No Drawings

COMPOSITIONS OF SULFONIUM YLIDES AND METHOD OF USE

DESCRIPTION OF THE INVENTION

This invention relates to new compositions of sulfonium ylides and their use in meliorating inflammation in warm-blooded animals. More particularly, it relates to compositions of 3-dialkylsulfonium ylides of 2-hydroxy-1,4-naphthoquinone [alternately named dialky(1,4-dihydro-3-hydroxy-1,4-dioxo-2-naphthyl)sulfonium hydroxide inner salts] and a pharmaceutically acceptable carrier and their use for the melioration of pain as anti-inflammatory agents.

The active components of the present compositions may be illustrated by the following formula:

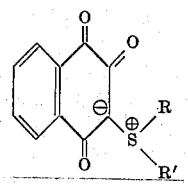

wherein R is methyl and R' is a member of the group consisting of lower alkyl and lower alkene, and where R and R' taken together is tetramethylene (SSR' being tetrahydrothiophene). The term lower alkyl is intended to cover those alkyl groups having one to six carbon atoms and lower alkene those alkene groups having two to four carbon atoms with one double bond present.

It is understood that all resonance forms are encompassed within the structure shown above, including the following:

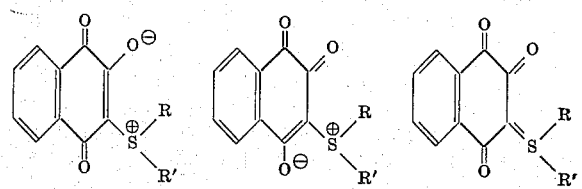

The preparation of the active components of the present compositions are described in the chemical literature and in the examples hereinafter.

The 3-dialkylsulfonium ylides of 2-hydroxy-1,4-naphthoquinone of this invention are highly active as anti-inflammatory agents and therefore useful in meliorating inflammation in warm-blooded animals. They are useful in dosages which range from about 5 to 100 mg. per kilogram per day of warm-blooded animal. The preferred range of dose is usually from 5 to 75 mg. per kilogram per day.

The active components of the present invention are yellow to brown crystalline solids which are soluble in organic solvents such as chloroform, dichloromethane, dimethyl sulfoxide, N,N-dimethylformamide, dioxane and the like.

For therapeutic administration the active 3-dialkylsulfonium ylides of 2-hydroxy-1,4-naphthoquinone of this invention may be incorporated with excipients and used, for example, in the form of tablets, dragees, capsules, suppositories, liquids, elixirs, emulsions, suspensions, syrups, chocolate, candy wafers, chewing gum, suspensions for parenteral administation, or the like.

Such compositions and preparations should contain at least 0.1 percent of active 3-dialkylsulfonium ylide of 2-hydroxy-1,4-naphthoquinone. The percentage in the compositions and preparations may, of course, be varied, and may conveniently be between about 2 and 60 percent or more of the weight of the unit. The amount of active 3-dialkylsulfonium ylide of 2-hydroxy-1,4-naphthoquinone in such therapeutically useful compositions or preparations is such that a suitable dosage will be obtained. These drugs can also be in the form of sustained release preparations. Preferred compositions or preparations according to the present invention are prepared so that, in general, a dosage unit form contains between about 5 and about 200 milligrams of the active 3-dialkylsulfonium ylide of 2-hydroxy-1,4-naphthoquinone. In the case of tablets, they may be scored to permit the use of fractional doses.

Tablets, pills, dragees, and the like may contain the following: a binder such as gum tragacanth, acacia, corn starch, or gelatin; a disintegrating agent such as corn starch, potato starch, alginic acid or the like; a lubricant such as stearic acid, magnesium stearate, talc, or the like; a sweetening agent such as sucaryl or saccharin may be added, as well as a flavoring agent such as peppermint, oil of wintergreen or cherry flavoring.

In determining the acute anti-inflammatory activity of the present compounds Royal Hart, Wistar strain rats ranging from 80 to 90 g. were used. The rats were fasted overnight prior to dosing but had free access to water. The drugs in aqueous suspension were administered by gavage in a volume of 1.7 ml./50 g. rat [corresponds to hydration volume used by Winter, et al., Proc Soc. Exp. Biol. Med., 111:544–547 (1962)].

The phlogistic agent used was carrageenin prepared as a sterile 1 percent suspension in 0.9 percent sodium chloride for routine testing. A volume of 0.05 ml. was injected through a 26 gauge needle into the plantar tissue of the right hind paw. Measurements were made 5 hours after drug administration (4 hours after carrageenin challenge) unless otherwise indicated.

Volumes of both the normal and carrageenin inflammmed feet were determined. The difference between the two measurements was considered to be the increased edema due to the carrageenin administration. Results were expressed as a C/T efficacy ratio (edema of control animals/edema of treated animals). The following Table I summarizes the results obtained with representative compounds of this invention.

TABLE I

The Effects of Anti-inflammatory Agents on Carrageenin Induced Edema of The Rat Paw[1]

| Drug Treatment | Oral Dose mg./kg. | No. Rats | Ratio Control/Treated Edema[2] |
|---|---|---|---|
| Controls | — | 64 | — |
| Aspirin | 250 | 32 | 2.8 |
| | 83 | 32 | 1.4 |
| | 27 | 32 | 1.2 |
| | 9 | 32 | 0.9 |
| | 3 | 32 | 1.0 |
| Phenylbutazone | 250 | 32 | 2.3 |
| | 83 | 32 | 2.4 |
| | 27 | 32 | 1.7 |
| | 9 | 32 | 1.3 |
| | 3 | 32 | 1.3 |
| Indomethacin | 250 | 32 | 2.9 |
| | 83 | 32 | 2.3 |
| | 27 | 32 | 2.2 |

TABLE I-Continued

The Effects of Anti-inflammatory Agents on Carrageenin Induced Edema of The Rat Paw[1]

| Drug Treatment | Oral Dose mg./kg. | No. Rats | Ratio Control/Treated Edema[2] |
|---|---|---|---|
| | 9 | 32 | 2.0 |
| | 3 | 32 | 1.5 |
| Drug Treatment | Oral Dose mg./kg. | No. Rats[3] | Ratio Control/Treated Edema[2] |
| The 3-Dimethylsulfonium Ylide of 2-Hydroxy-1,4-naphthoquinone | 250 | 20 | 2.1 |
| | 83 | 20 | 1.6 |
| | 27 | 20 | 1.4 |
| | 9 | 20 | 1.4 |
| The 3-Ethylmethylsulfonium Ylide of 2-Hydroxy-1,4-naphthoquinone | 250 | 8 | 3.0 |
| The 3-Methyl-n-propylsulfonium Ylide of 2-Hydroxy-1,4-naphthoquinone | 250 | 8 | 2.6 |
| The 3-Allylmethylsulfonium Ylide of 2-Hydroxy-1,4-naphthoquinone | 250 | 8 | 2.1 |
| The 3-Tetrahydro-1-thiophenium Ylide of 2-Hydroxy-1,4-naphthoquinone | 250 | 8 | 2.7 |

[1] Rats fasted overnight prior to testing.
[2] Measurements made five hours after oral administration.
[3] Pooled data.

Anti-inflammatory activity was demonstrated by suppression of ultraviolet light induced erythema of guinea pigs.

In order to test erythema in albino guinea pigs (Lederle breeding colony) they were depilitated on their flanks, the evening before testing, with a standard mixture of barium sulfide and gum acacia. On the morning of testing, groups of four guinea pigs were dosed by gavage 1 hour prior to ultraviolet exposure (−1 hour). At 0 hour they were restrained in a plastic container which allows exposure of three circular spots. They were then exposed to ultraviolet irradiation from a "Hanovia" Kromayer lamp model 10 for 60 seconds. At +1 and +4 hours the degree of erythema for each of the three sites was assessed according to the following scoring system: 0 = no erythema, 0.5 = incomplete circle or faint erythema and 1.0 = complete circle of distinct erythema. Thus, the maximum score for each animal was 3.0. The following Table II summarizes the results obtained with representative compounds of the present invention.

Tests to show activity against chronic inflammation in adjuvant arthritis were carried out. Groups of three Royal Hart Wistar strain rats, weighing 200 ± 10 g. each were injected intradermally in the right hind paw with Freund's adjuvant (dried human tubercle bacilli in a mineral oil vehicle) at a dose of 2 mg./kg. of body weight. Test compounds were administered orally in a 1.5 percent starch vehicle at the indicated dosage in mg./kg. of body weight once daily on days 0 through 13 post-challenge. Control rats were treated in a similar manner, but given starch vehicle instead of the test compound. On the 14th and 21st day post-challenge the diameter of the inejcted paw (primary lesion) is measured by micrometer caliper, the volumes of inflamed paws are estimated from these measurements, and the results are expressed as percent inhibition of swelling as compared to controls at the same time, the other inflammed sites, such as ears, paws and tail (secondary lesions) are observed and the rat graded as to degree of inflammation and swelling present. The grading is based on a scale of 0 to 24.0, where 0 represents a complete absence of induced arthritis nodules and 24.0 represents the maximum degree of inflammation. The means grade for each treated group is calculated and the effects of each compound are expressed as percent inhibition of control grade. The following Table III summarizes the results obtained when well-known anti-inflammatory agents are tested along with a representative compound of this invention.

Some of the components of the present invention are active as analgetic agents when measured by the "writhing syndrome" test for analgetic activity as de-

TABLE II

The Effects of Anti-inflammatory Agents on Development of Erythema in Guinea Pigs

| Treatment | Oral Dose mg./kg. | Score (Avg.) B | | Dead G.P./Total | Decision |
|---|---|---|---|---|---|
| | | 1 hr. | 4 hr. | | |
| Control | — | 2.1 | 2.8 | 4/384 | — |
| Aspirin | 250 | 0.1 | 1.2 | 7/88 | A |
| | 125 | 0.1 | 2.0 | 1/16 | A |
| | 62.5 | 0.8 | 2.0 | 2/11 | A |
| | 31.3 | 1.2 | 2.3 | 0/12 | |
| Phenylbutazone | 250 | 0 | 0.5 | 2/60 | A |
| | 125 | 0.1 | 1.1 | 0/16 | A |
| | 62.5 | 0.3 | 0.9 | 1/12 | A |
| | 31.3 | 0.4 | 1.7 | 1/12 | A |
| | 15.6 | 0.4 | 2.3 | 0/8 | A |
| | 7.8 | 1.1 | 2.9 | 0/8 | |
| The 3-Dimethylsulfonium Ylide of 2-Hydroxy-1,4-naphthoquinone | 125 | 0 | 0 | 1/4 | A |
| | 62.5 | 0 | 0.7 | 1/8 | A |
| | 31.3 | 0 | 1.3 | 0/4 | A |
| | 15.6 | 0 | 1.9 | 1/4 | A |
| | 7.8 | 0.6 | 2.1 | 0/4 | A |
| | 3.9 | 0.6 | 2.3 | 0/4 | A |
| The 3-Ethylmethylsulfonium Ylide of 2-hydroxy-1,3-napthoquinone | 250 | 0.5 | 0.6 | 4/4 | A |
| | 125 | 0 | 0.6 | 1/4 | A |
| The 3-Methyl-n-propylsulfonium Ylide of 2-Hydroxy-1,4-naphthoquinone | 250 | 0 | 0.6 | 4/4 | A |
| | 125 | 0.2 | 1.3 | 0/8 | A |
| The 3-Methyl-n-pentylsulfonium Ylide of 2-Hydroxy-1,4-naphthoquinone | 250 | 0.3 | 1.3 | 1/4 | A |

A = Active (discriminant function analysis).
B = Pooled data.

TABLE III

The Effects of Anti-inflammatory Agents on Adjuvant Arthritis of Rats
(Treatment Day 0 to Day 13)

|  | Oral Dose mg./kg./day | Dead/Treated at 21 Days | Mean Weight Gain (Gms.) | | % Inhibition of Swelling (Primary Lesion) | |
|---|---|---|---|---|---|---|
|  |  |  | Day 14 | Day 21 | Day 14 | Day 21 |
| Normal rats | — | 4/51 | 69[a] | 110[a] | — | — |
| Adjuvant Controls | — | 21/234 | 36 | 39 | 0 | 0 |
| Phenylbutazone | 150 | 0/18 | 45 | 50 | 80[a] | 44[a] |
|  | 75 | 2/18 | 57[a] | 54 | 72[a] | 23[a] |
|  | 37.5 | 2/18 | 47 | 50 | 67[a] | 19 |
| Aspirin | 400 | 4/18 | 48 | 57 | 76[a] | 68[a] |
|  | 200 | 1/18 | 31 | 27 | 51[a] | 36[a] |
|  | 100 | 7/18 | 42 | 49 | 40[a] | 21[a] |
| The 3-Dimethyl- | 50 | 3/9 | −4 | 20 | 66[a] | 49[a] |
| sulfonium Ylide of | 25 | 3/18 | 35 | 34 | 40[a] | 31[a] |
| 2-Hydroxy-1,4- | 12.5 | 2/15 | 36 | 27 | 15 | 0 |
| naphthoquinone | 6.25 | 1/6 | 30 | 37 | 0 | 2 |

[a]Significantly different from adjuvant controls ($p = < 0.05$ by $t$ test)

scribed by Siegmund, et al., *Proceedings of the Society for Experimental Biology and Medicine*, 95:729 (1957), with modifications. This method is based upon the reduction of the number of writhes following the intraperitoneal injection of 1 mg./kg. of body weight of phenyl-p-quinone in male Swiss albino mice weighing 15–25 grams per mouse. The syndrome is characterized by intermittent contractions of the abdomen, twisting and turning of the trunk, and extension of the hind legs beginning three to give minutes after injection of the phenyl-p-quinone. The total number of writhes exhibited by each group of mice is recorded for a 3-minute period commencing 15 minutes after injection of the phenyl-p-quinone. A compound is considered active if it reduces the total number of writhes in two test mice from a control value of approximately 30 per pair to a value of 18 or less. The following Table IV summarizes the relative activity of representative compounds as active analgetics, and compares them with the reference drug aspirin.

Experiments are conducted to determine analgesia by a modification of the method of Randall and Selitto [*Arch. Int. Pharmacodyn*, 111:409–419, (1957)]. This method is used to measure the pain threshold of rats whose paws were made sensitive to pressure by injection of a 20 percent aqueous suspension (0.1 ml.) of brewers yeast into the plantar surface of the left hind paw. That pressure in grams, which when applied to the inflamed paw elicits a sudden struggle or vocalization, is recorded. A maximum (cutoff) pressure of 250 grams is employed. Control rats respond at a pressure of about 25 grams. A ratio of post-treatment/pre-treatment reaction threshold is calculated. The following Table V summarizes the results obtained when a representative compound is compared to aspirin, a well-known analgetic agent.

TABLE IV

The Effects of Analgetic Agents on Phenyl-p-quinone Induced Writhing in Mice

| Compound | Dose (Oral) mg./kg. of Body Weight | Number of Writhes Pair No. 1 | Pair No. 2 |
|---|---|---|---|
| The 3-Dimethylsulfonium Ylide of 2-Hydroxy-1,4-naphthoquinone | 200 | 12 | 8 |
| The 3-Ethylmethylsulfonium Ylide of 2-Hydroxy-1,4-Naphthoquinone | 200 | 12 | 14 |
| Aspirin | 100 | 1 (historical average) |  |

SPECIFIC DISCLOSURE

The following examples describe in detail the syntheses of active components of the present invention and fomulations of various types of pharmaceutical preparations.

TABLE V

The Effects of Analgetic Agents on the Paw Pain Threshold of Rats

| Compound | Dose mg./kg. of Body Weight | Post-Treatment/Pre-Treatment Pressure Threshold (Average of Five Rats Each Time Period) Hours After Treatment | | | | | |
|---|---|---|---|---|---|---|---|
|  |  | 1 | 2 | 3 | 4 | 5 | 6 |
| The Dimethylsulfonium Ylide of 2-Hydroxy-1,4-naphthoquinone | 100 (i.p.) | 1.7 | 1.4 | 1.6 | 1.9 | 1.8 |  |
| Aspirin | 200 (oral) | 1.1 | 1.1 | — | 1.6 | — | 1.0 |

EXAMPLE 1

Preparation of the 3-Dimethylsulfonium Ylide of 2-Hydroxy-1,4-naphthoquinone [or (1,4-dihydro-3-hydroxy-1,4-dioxo-2-naphthyl)-dimethylsulfonium hydroxide Inner Salt]

The above compound is prepared as described by R. Gompper and H. Euchner, Ber., 99, 527 (1966).

EXAMPLE 2

Preparation of 2-Hydroxy-3-(methylthio)-1,4-naphthoquinone

A mixture of 2.34 g. of the 3-dimethylsulfonium ylide of 2-hydroxy-1,4-naphthoquinone, 1.43 ml. of 70–72 percent perchloric acid and 25 ml. of pyridine is heated under reflux for 2 hours and allowed to stand at room temperature overnight. The dark reddish-black solution is evaporated under reduced pressure to a reddish-black crystalline residue. The residue is extracted with four 35-ml. portions of boiling ether and the combined ether extracts are evaporated under reduced pressure to give 1.80 g. of red crystals, melting point 116°–119°C. Recrystallization from ethyl acetate-petroleum ether (30°–60°C.) gives 1.46 g. of 2-hydroxy-3-(methylthio)-1,4-naphthoquinone as blood-red needles, melting point 127°–129°C.

EXAMPLE 3

Preparation of the 3-Ethylmethylsulfonium Ylide of 2-Hydroxy-1,4-naphthoquinone [or (1,4-Dihydro-3-hydroxy-1,4-dioxo-2-naphthyl)ethylmethylsulfonium Hydroxide Inner Salt]

A mixture of 6.80 g. of 2-hydroxy-3-(methylthio)-1,4-naphthoquinone, 19.3 g. of ethyl iodide, 4.40 g. of diisopropylethylamine and 100 ml. of absolute ethanol is heated under reflux for 4.5 hours. The dark colored solution is evaporated under reduced pressure until crystallization occurs. The mixture is chilled and filtered and the yellow crystals are washed with absolute ethanol and 50 percent absolute ethanol-ether to give 8.11 g. of yellow crystals, melting point 130°–145°C. Two recrystallizations from absolute ethanol gives 4.72 g. of the 3-ethylmethylsulfonium ylide of 2-hydroxy-1,4-naphthoquinone as yellow crystals, melting point 181.5°–184°C.

EXAMPLE 4

Preparation of the 3-Methyl-n-propylsulfonium Ylide of 2-Hydroxy-1,4-naphthoquinone [or (1,4-Dihydro-3-hydroxy-1,4-dioxo-2-naphthyl)methyl-n-propylsulfonium Hydroxide Inner Salt]

A mixture of 0.880 g. of 2-hydroxy-3-(methylthio)-1,4-naphthoquinone, 0.857 g. of n-propyl p-toluenesulfonate, 1.03 g. of diisopropylethylamine and 10 ml. of absolute ethanol is allowed to stand at room temperature for 16 hours and is then heated under reflux for 6 hours. After standing for 3 days, 0.466 g. of yellow crystals, melting point 181.5°–185°C., are obtained by filtration. Recrystallization from absolute ethanol gives 0.360 g. of the 3-methyl-n-propylsulfonium ylide of 1,4-naphthoquinone as yellow crystals, melting point 182°–184°C.

EXAMPLE 5

Preparation of the 3-Allylmethylsulfonium Ylide of 2-Hydroxy-1,4-naphthoquinone [or Allyl(1,4-dihydro-3-hydroxy-1,4-dioxo-2-naphthyl)methylsulfonium Hydroxide Inner Salt]

To a stirred solution of 5.00 g. of 2-hydroxy-3-(methylthio)-1,4-naphthoquinone, 2.93 g. of diisopropylethylamine and 50 ml. of absolute ethanol is added 3.93 ml. of allyl bromide. Yellow crystals separate from solution in 15 minutes and the mixture is chilled overnight. The yellow crystals of the 3-allylmethylsulfonium ylide of 2-hydroxy-1,4-naphthoquinone are removed by filtration, washed with ethanol:ether (1:1) and air-dried: yield, 5.36 g., melting point 110°–112°C.

EXAMPLE 6

Preparation of the 3-Methyl-n-pentylsulfonium Ylide of 2-Hydroxy-1,4-naphthoquinone [or (1,4-Dihydro-3-hydroxy-1,4-dioxo-2-naphthyl)methyl-n-pentylsulfonium Hydroxide Inner Salt]

A mixture of 10.0 g. of 2-hydroxy-3-(methylthio)-1,4-naphthoquinone, 11.0 g. of n-pentyl p-toluenesulfonate, 5.87 g. of diisopropylethylamine and 100 ml. of absolute ethanol is heated under reflux for 18.5 hours and then chilled. The product is removed by filtration, washed with absolute ethanol-ether and air-dried to yield 3.91 g. of orange-yellow crystals, melting piont 155°–160°C. Recrystallization from absolute ethanol, using activated charcoal, gives 3.29 g. of the 3-methyl-n-pentylsulfonium ylide of 2-hydroxy-1,4-naphthoquinone as yellow crystals, melting point 164°–167°C.

EXAMPLE 7

Preparation of the 3-Tetrahydro-1-thiophenium Ylide of 2-Hydroxy-1,4-naphthoquinone [or (1,4-Dihydro-3-hydroxy-1,4-dioxo-2-naphthyl)tetrahydro-1-thiophenium Hydroxide Inner Salt]

A mixture of 7.0 g. of 2-hydroxy-1,4-naphthoquinone, 9.0 ml. of tetramethylene sulfoxide and 5.0 ml. of acetic anhydride is heated on a steambath for 5 hours and chilled overnight at −15°C. The dark tarry mass which separated is washed by trituration with 50 ml. of ether and crystallized from acetone. The brownish-black crystals are collected by filtration, washed with acetone and ether and dried to give a product of melting point 195°–200°C. Recrystallization from absolute ethanol gives 1.4 g. of the 3-tetrahydro-1-thiophenium ylide of 2-hydroxy-1,4-naphthoquinone as brown crystals, melting point 200°–201°C.

EXAMPLE 8

| Preparation of Oral Syrup | | |
|---|---|---|
| Ingredient | | Amount |
| Active ingredient: | the 3-Dimethylsulfonium Ylide of 2-Hydroxy-1,4-naphthoquinone | 500 mg. |
| Sorbitol solution (70% N.F.) | | 40 ml. |
| Sodium benzoate | | 150 mg. |
| Saccharin | | 10 mg. |
| Red Dye (F.D. & C. No. 2) | | 10 mg. |
| Cherry Flavor | | 50 mg. |
| Distilled water, q.s. ad | | 100 ml. |

The sorbitol solution is added to 40 ml. of distilled water and the active ingredient is suspended therein. The saccharin, sodium benzoate, flavor and dye are added and dissolved in the above solution. The volume is adjusted to 100 ml. with distilled water. Each ml. of syrup contains 5 mg. of drug.

Other ingredients may replace those listed in the above formulation. For example, a suspending agent such as bentonite magma, tragacanth, carboxymethylcellulose or methylcellulose may be used. Phosphates, citrates or tartartes may be added as buffers. Preservatives may include the parabens, sorbic acid and the like and other flavors and dyes may be used in place of those listed above.

We claim:

1. A therapeutic composition for the melioration of pain in a warm-blooded animal which comprises a solid pharmaceutically acceptable carrier and from 10 to about 200 mg. of a sulfonium ylide of the formula:

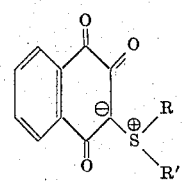

wherein R is methyl and R' is a member of the group consisting of lower alkyl ($C_1$–$C_6$) and lower alkene ($C_2$–$C_4$) said composition being in the form of a tablet, dragee, capsule or suppository.

2. The therapeutic composition in accordance with claim 1, wherein the sulfonium ylide is the 3-dimethylsulfonium ylide of 2-hydroxy-1,4-naphthoquinone.

3. The therapeutic composition in accordance with claim 1, wherein the sulfonium ylide is the 3-ethylmethylsulfonium ylide of 2-hydroxy-1,4-naphthoquinone.

4. A method of meliorating inflammation in a warm-blooded animal which comprises administering internally to said warm-blooded animal an anti-inflammatory amount of sulfonium ylide of the formula:

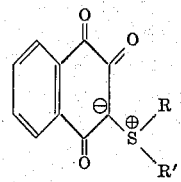

wherein R is methyl and R' is a member of the group consisting of lower alkyl ($C_1$–$C_6$) and lower alkene ($C_2$–$C_4$), in association with a pharmaceutically acceptable carrier.

5. The method in accordance with claim 4, in which the slufonium ylide is the 3-dimethylsulfonium ylide of 2-hydroxy-1,4-naphthoquinone.

6. The method in accordance with claim 4, in which the sulfonium ylide is the 3-ethylmethylsulfonium ylide of 2-hydroxy-1,4-naphthoquinone.

7. The method in accordance with claim 4, in which the sulfonium ylide is the 3-methyl-n-propylsulfonium ylide of 2-hydroxy-1,4-naphthoquinone.

8. The method in accordance with claim 4, in which the sulfonium ylide is the 3-allylmethylsulfonium ylide of 2-hydroxy-1,4-naphthoquinone.

* * * * *